(12) United States Patent
Matloff

(10) Patent No.: US 12,121,826 B2
(45) Date of Patent: Oct. 22, 2024

(54) HAND GESTURE CONTROLLED FLYING TOY

(71) Applicant: AMAX GROUP USA, LLC, Bellaire, TX (US)

(72) Inventor: Darren Scott Matloff, Los Angeles, CA (US)

(73) Assignee: AMAX GROUP USA, LLC, Houston, TX (US)

( * ) Notice: Subject to any disclaimer, the term of this patent is extended or adjusted under 35 U.S.C. 154(b) by 567 days.

(21) Appl. No.: 17/332,177

(22) Filed: May 27, 2021

(65) Prior Publication Data

US 2021/0370192 A1    Dec. 2, 2021

Related U.S. Application Data

(60) Provisional application No. 63/031,191, filed on May 28, 2020.

(51) Int. Cl.
*A63H 27/14* (2006.01)
*A63H 30/00* (2006.01)
(Continued)

(52) U.S. Cl.
CPC .............. *A63H 27/14* (2013.01); *A63H 30/00* (2013.01); *G05D 1/0858* (2013.01); *G05D 1/102* (2013.01); *G05D 1/106* (2019.05); *A63H 27/12* (2013.01)

(58) Field of Classification Search
CPC ...... A63H 27/14; G05D 1/0858; G05D 1/106; G05D 2201/0214
See application file for complete search history.

(56) References Cited

U.S. PATENT DOCUMENTS

D31,369 S    8/1899 Lundell
880,633 A    3/1908 Curtis
(Continued)

FOREIGN PATENT DOCUMENTS

CN    103357182    10/2013
CN    103364785    10/2013
(Continued)

OTHER PUBLICATIONS

U.S. Appl. No. 29/864,876, including its patent prosecution history and the Office Actions therein., filed Jun. 24, 2022, Matloff.
(Continued)

*Primary Examiner* — Thomas H Henry
(74) *Attorney, Agent, or Firm* — Knobbe, Martens, Olson & Bear, LLP

(57) ABSTRACT

A hand gesture controlled flying toy can utilize one or more infrared sensors and/or pressure sensors to determine how a user is interacting with the flying toy and conduct aerial maneuvers based on those interactions. The flying toy may be configured to ascend when lateral infrared sensors detect reflections of infrared light in multiple lateral directions. The flying toy may be configured to ascend when a pressure sensor detects a pressure increase from below the flying toy. The flying toy may be configured to conduct a roll responsive to an upward infrared sensor and a lateral infrared sensor detecting reflections of infrared light. The roll may be oriented at least partially based on which lateral infrared sensor detected a reflection.

18 Claims, 10 Drawing Sheets

(51) Int. Cl.
*G05D 1/00* (2024.01)
*A63H 27/00* (2006.01)

(56) References Cited

U.S. PATENT DOCUMENTS

| | | |
|---|---|---|
| 1,554,065 A | 9/1925 | Blair |
| D144,034 S | 3/1946 | Budlong |
| 3,019,555 A | 2/1962 | Poticha |
| 3,053,480 A | 9/1962 | Vanderlip |
| 3,204,891 A | 9/1965 | Cline |
| 3,213,944 A | 10/1965 | Nichols et al. |
| 3,805,444 A | 4/1974 | Adickes |
| 4,065,873 A | 1/1978 | Jones |
| 4,337,950 A | 7/1982 | Gidge |
| D295,430 S | 4/1988 | Smith |
| D303,106 S | 8/1989 | Macaluso |
| 4,921,458 A | 5/1990 | Greenwood |
| D315,198 S | 3/1991 | Chiang |
| 5,030,157 A | 7/1991 | Silverglate |
| 5,071,383 A | 12/1991 | Kinoshita |
| 5,080,624 A | 1/1992 | Brinker |
| 5,115,998 A | 5/1992 | Olive |
| D327,945 S | 7/1992 | Chiang |
| D329,695 S | 9/1992 | Lin |
| 5,269,716 A | 12/1993 | Viola |
| D349,570 S | 8/1994 | Radtke |
| D359,553 S | 6/1995 | Hsi |
| D364,452 S | 11/1995 | Wiggins |
| D374,926 S | 10/1996 | Sheh |
| 5,645,248 A | 7/1997 | Campbell |
| 5,672,086 A | 9/1997 | Dixon |
| D387,153 S | 12/1997 | Fok |
| 5,713,710 A | 2/1998 | Strong et al. |
| D408,466 S | 4/1999 | Mintchenko |
| 6,260,796 B1 | 7/2001 | Klingensmith |
| D453,359 S | 2/2002 | Naslund |
| 6,468,123 B1 | 10/2002 | Valencia |
| 6,550,715 B1 | 4/2003 | Reynolds et al. |
| D496,695 S | 9/2004 | Davis |
| 6,976,899 B1 | 12/2005 | Tamanas |
| 7,273,195 B1 | 9/2007 | Golliher |
| D563,609 S | 3/2008 | Gick |
| D569,961 S | 5/2008 | Wong |
| D589,604 S | 3/2009 | Hsu |
| 7,497,759 B1 | 3/2009 | Davis |
| 8,033,498 B2 | 10/2011 | Blackburn |
| 8,035,734 B2 | 10/2011 | Jones |
| D664,214 S | 7/2012 | Yuen |
| D697,145 S | 1/2014 | Wong |
| 8,639,400 B1 * | 1/2014 | Wong .................. A63H 27/12 701/16 |
| D710,452 S | 8/2014 | Barajas et al. |
| D710,453 S | 8/2014 | Barajas et al. |
| 9,061,558 B2 | 6/2015 | Kalantari et al. |
| D734,400 S | 7/2015 | Rehkemper et al. |
| D736,368 S | 8/2015 | Xu et al. |
| D740,892 S | 10/2015 | Chen |
| D741,779 S | 10/2015 | Hsiao et al. |
| D751,490 S | 3/2016 | Chen |
| D765,188 S | 8/2016 | LaRussa |
| D768,539 S | 10/2016 | Lee |
| D778,782 S | 2/2017 | Chen et al. |
| 9,599,992 B2 | 3/2017 | Kohstall |
| D784,202 S | 4/2017 | Park |
| 9,663,227 B1 | 5/2017 | Lema et al. |
| D795,741 S | 8/2017 | Li |
| D795,742 S | 8/2017 | Li |
| D795,967 S | 8/2017 | Haley et al. |
| 9,725,158 B2 | 8/2017 | Yan |
| D797,602 S | 9/2017 | Li |
| D798,961 S | 10/2017 | Li |
| 9,783,286 B1 | 10/2017 | Yang |
| 9,811,094 B2 | 11/2017 | Tsai |
| D805,129 S | 12/2017 | Nagata |
| 9,889,930 B2 | 2/2018 | Welsh |
| D813,723 S | 3/2018 | Ahn et al. |
| D813,724 S | 3/2018 | Hu |
| D814,973 S | 4/2018 | Li |
| D815,580 S | 4/2018 | Kim et al. |
| D817,252 S | 5/2018 | Kim et al. |
| D818,874 S | 5/2018 | Tian et al. |
| D821,263 S | 6/2018 | Goldy |
| 10,000,284 B1 | 6/2018 | Purwin et al. |
| D822,823 S | 7/2018 | Yu |
| D827,724 S | 9/2018 | Barajas et al. |
| D828,222 S | 9/2018 | Yu |
| D830,476 S | 10/2018 | Barse |
| D830,946 S | 10/2018 | Matus |
| 10,099,783 B1 | 10/2018 | Nilson |
| 10,101,748 B2 | 10/2018 | Wang |
| 10,106,277 B2 | 10/2018 | Neely |
| 10,112,694 B2 | 10/2018 | Yan et al. |
| D846,669 S | 4/2019 | Adkins et al. |
| D849,154 S | 5/2019 | Zhao et al. |
| D849,845 S | 5/2019 | Zhao et al. |
| 10,281,930 B2 | 5/2019 | Hutson |
| D854,448 S | 7/2019 | Chen et al. |
| D855,705 S | 8/2019 | Zhao et al. |
| D856,259 S | 8/2019 | Li et al. |
| D856,848 S | 8/2019 | Kim et al. |
| D857,105 S | 8/2019 | Zhang et al. |
| D861,573 S | 10/2019 | He et al. |
| D864,022 S | 10/2019 | Gan |
| D866,395 S | 11/2019 | O'Brien et al. |
| D866,396 S | 11/2019 | Chen et al. |
| D867,207 S | 11/2019 | O'Brien et al. |
| 10,507,917 B2 | 12/2019 | Taylor et al. |
| D873,175 S | 1/2020 | Li |
| D874,338 S | 2/2020 | Zhao et al. |
| D881,067 S | 4/2020 | Zhou |
| D882,460 S | 4/2020 | Chen |
| D884,554 S | 5/2020 | Chen |
| 10,679,511 B2 | 6/2020 | Kikuchi et al. |
| D889,632 S | 7/2020 | Ediger et al. |
| D890,267 S | 7/2020 | Liao |
| D891,521 S | 7/2020 | Liao |
| D891,522 S | 7/2020 | Liao |
| D892,225 S | 8/2020 | Liao |
| D898,894 S | 10/2020 | Breit et al. |
| D904,279 S | 12/2020 | Kim et al. |
| D908,588 S | 1/2021 | Zhao et al. |
| D918,087 S | 5/2021 | He et al. |
| D918,308 S | 5/2021 | Xu |
| D921,302 S | 6/2021 | Paraha |
| D951,815 S | 5/2022 | Wang |
| D959,638 S | 8/2022 | Ahn |
| D960,241 S | 8/2022 | Cran et al. |
| D966,428 S | 10/2022 | Wang |
| D970,392 S | 11/2022 | Wang |
| D971,079 S | 11/2022 | Li |
| D971,080 S | 11/2022 | Li |
| D972,041 S | 12/2022 | Tao |
| D972,042 S | 12/2022 | Tao |
| D972,454 S | 12/2022 | Wang |
| D972,973 S | 12/2022 | Xu |
| D973,539 S | 12/2022 | Li |
| D974,959 S | 1/2023 | Wang et al. |
| D977,583 S | 2/2023 | Tao |
| D980,334 S | 3/2023 | Wang |
| D983,905 S | 4/2023 | Chen |
| D992,650 S | 7/2023 | Xiao |
| D1,001,009 S | 10/2023 | Matloff |
| D1,003,214 S | 10/2023 | Matloff |
| D1,010,004 S | 1/2024 | Matloff |
| 2003/0232565 A1 | 12/2003 | Silverglate |
| 2004/0161999 A1 | 8/2004 | Yu |
| 2004/0162001 A1 | 8/2004 | Davis |
| 2005/0173589 A1 | 8/2005 | Davis |
| 2005/0187677 A1 | 8/2005 | Walker |
| 2006/0121818 A1 | 6/2006 | Lee et al. |
| 2009/0121076 A1 | 5/2009 | Blackburn |
| 2009/0215355 A1 | 8/2009 | Elson et al. |
| 2010/0120321 A1 | 5/2010 | Rehkemper et al. |
| 2010/0224723 A1 | 9/2010 | Apkarian |

(56) References Cited

U.S. PATENT DOCUMENTS

| | | | |
|---|---|---|---|
| 2014/0008496 A1 | 1/2014 | Ye et al. | |
| 2014/0131507 A1 | 5/2014 | Kalantari et al. | |
| 2014/0319266 A1 | 10/2014 | Moschetta et al. | |
| 2015/0346722 A1 | 12/2015 | Herz et al. | |
| 2015/0348424 A1 | 12/2015 | Duffy et al. | |
| 2015/0379876 A1* | 12/2015 | Navot | G08G 5/0069 701/301 |
| 2016/0068267 A1 | 3/2016 | Liu et al. | |
| 2016/0286128 A1 | 9/2016 | Zhou | |
| 2017/0053169 A1 | 2/2017 | Cuban et al. | |
| 2017/0069214 A1 | 3/2017 | Dupray et al. | |
| 2017/0097435 A1 | 4/2017 | Hull et al. | |
| 2017/0123487 A1 | 5/2017 | Hazra et al. | |
| 2017/0166315 A1 | 6/2017 | Noroian | |
| 2017/0248970 A1 | 8/2017 | Karabed | |
| 2017/0308085 A1 | 10/2017 | Hall | |
| 2017/0313401 A1 | 11/2017 | Tang et al. | |
| 2017/0349264 A1 | 12/2017 | Nilson et al. | |
| 2018/0039271 A1 | 2/2018 | Rimoux et al. | |
| 2018/0074519 A1 | 3/2018 | Qin et al. | |
| 2018/0111683 A1 | 4/2018 | Di Benedetto et al. | |
| 2018/0114058 A1 | 4/2018 | Kahn | |
| 2018/0150073 A1 | 5/2018 | Lee et al. | |
| 2018/0196435 A1 | 7/2018 | Kunzi et al. | |
| 2018/0208309 A1 | 7/2018 | Wang | |
| 2018/0217614 A1 | 8/2018 | Salas-Moreno et al. | |
| 2018/0259953 A1 | 9/2018 | Park et al. | |
| 2018/0343401 A1 | 11/2018 | Campbell et al. | |
| 2019/0054386 A1 | 2/2019 | Tian et al. | |
| 2019/0127067 A1 | 5/2019 | Parrello et al. | |
| 2019/0219997 A1 | 7/2019 | Benda et al. | |
| 2019/0243357 A1 | 8/2019 | Qiu et al. | |
| 2019/0315460 A1* | 10/2019 | Park | B64U 10/13 |
| 2020/0027358 A1 | 1/2020 | Fine | |
| 2020/0033852 A1 | 1/2020 | Park et al. | |
| 2020/0108914 A1* | 4/2020 | Yoo | G05D 1/0094 |
| 2020/0159252 A1 | 5/2020 | Giuffrida | |
| 2020/0239188 A1 | 7/2020 | Liao | |
| 2022/0097865 A1 | 3/2022 | Sidoti et al. | |
| 2022/0234734 A1 | 7/2022 | Lai | |
| 2022/0314137 A1 | 10/2022 | Liao | |
| 2023/0010644 A1 | 1/2023 | Heggen | |
| 2023/0130172 A1 | 4/2023 | Liao | |

FOREIGN PATENT DOCUMENTS

| | | |
|---|---|---|
| CN | 104606901 | 5/2015 |
| CN | 104808799 | 7/2015 |
| CN | 104941203 | 9/2015 |
| CN | 204871599 | 12/2015 |
| CN | 204891215 | 12/2015 |
| CN | 205031895 | 2/2016 |
| CN | 205049143 | 2/2016 |
| CN | 205661644 | 10/2016 |
| CN | 205819581 | 12/2016 |
| CN | 106843273 | 6/2017 |
| CN | 107399436 | 11/2017 |
| CN | 107807662 | 3/2018 |
| CN | 207292396 | 5/2018 |
| CN | 108177787 | 6/2018 |
| CN | 207516831 U9 | 6/2018 |
| CN | 1304672955 S | 6/2018 |
| CN | 304710436 S | 7/2018 |
| CN | 108474656 | 8/2018 |
| CN | 109568979 | 4/2019 |
| CN | 305142454 S | 5/2019 |
| CN | 305228200 | 6/2019 |
| CN | 110045742 | 7/2019 |
| CN | 209433249 U | 9/2019 |
| CN | 209490474 | 10/2019 |
| CN | 110515457 | 11/2019 |
| CN | 209865306 | 12/2019 |
| CN | 210592431 | 5/2020 |
| CN | 306041049 S | 9/2020 |
| CN | 111913580 | 11/2020 |
| CN | 211912721 | 11/2020 |
| CN | 112335974 | 2/2021 |
| EM | 007385158-0001 | 12/2019 |
| EP | 004750883-0001 | 11/2018 |
| EP | 004750883-0002 | 11/2018 |
| GB | 6049587 | 12/2018 |
| GB | 6063924 | 6/2019 |
| JP | 2010052713 | 3/2010 |
| JP | 2019507924 | 3/2019 |
| JP | 2019081526 | 5/2019 |
| KR | 101990494 | 6/2019 |
| WO | WO 2006/100523 | 9/2006 |
| WO | WO 2016/154939 | 10/2016 |
| WO | WO 2017/047546 | 3/2017 |
| WO | WO 2017/165854 | 9/2017 |
| WO | WO 2017/199940 | 11/2017 |
| WO | WO 2019/168410 | 9/2019 |

OTHER PUBLICATIONS

Nakata, T. et al., Aerodynamic imaging by mosquitoes inspires a surface detector for autonomous flying vehicles, Bioinspired Robots, Science, vol. 368, pp. 634-637, 2020.

Young, J. et al., Drones become even more insect-like, Engineering, Science, vol. 368, Issue 6491, 2020.

Mohamed, A., et al "Bioinspired Wing-Surface Pressure Sensing for Attitude Control of Micro Air Vehicles," Journal of Aircraft, vol. 52. No. 3, pp. 1-12, 2015.

Decision on the Examination of the Request for Invalidation Declaration, dated Jan. 25, 2022 in Chinese Application Patent No. 202020416215.2 in 11 pages.

Guangzhou Court of Intellectual Property Rights Civil Judgement, dated Aug. 15, 2022 in 21 pages.

Decision on the Examination of the Request for Invalidation Declaration, dated Oct. 21, 2022 in Chinese Application Patent No. 202020416215.2 in 7 pages.

U.S. Appl. No. 29/711,892, including its patent prosecution history and the Office Actions therein., filed Nov. 4, 2019, Matloff.

U.S. Appl. No. 29/736,205, including its patent prosecution history and the Office Actions therein., filed May 28, 2020, Matloff.

U.S. Appl. No. 29/744,979, including its patent prosecution history and the Office Actions therein., filed Aug. 3, 2020, Matloff.

U.S. Appl. No. 29/787,937, including its patent prosecution history and the Office Actions therein., filed Jun. 9, 2021, Matloff.

U.S. Appl. No. 29/864,873, including its patent prosecution history and the Office Actions therein., filed Jun. 24, 2022, Matloff.

DroneZon, 12 Top Collision Avoidace Drones and Obstacle Detection, Drones, Drone Technology, Knowledge, News & Reviews, http://www.dronezon.com/learn-about-drones-quadcotpers/top-dr.

Gesture Remote Control Four Axis Smart Drone, Sibling Gadget, https://siblinggadget.com/products/drone, printed on Sep. 7, 2020.

Guidance User Manual V1.6, dated Oct. 2015.

Low-Cost Obstacle Detection System, FlytBase, https://blogs.flyltbase.com/low-cost-obstacle-detection-system/.

Phantom 4 User Manual V1.0, dated Mar. 2016.

RC Drone No Camera Induction Mini Drones Four-Axis Aircraft UFO Remote Control Helicopter RC Toys for Kids RC Quadcopter Toy.

Buy Toy New Kids Hand Operated Plastic Drone for Kids and Adults—Hand Sensing Mini Drone Helicopter, Easy Indoor Small Orb Flying Ball Drone.

ForBEST Gesture Control Drone Rc Quadcopter Aircraft Hand Sensor Drone with Smart Watch Controlled, 2 Batteries.

Mini RC Drone JJRC H74 2.4G Intelligent Gesture Sensing Control Aircraft.

UFO Drone toys Mini Drone UFO Flying Aircraft Toy—Small Drone Perfect for Indoor Outdoor Play—Cool Hand Controlled Drone for Kids.

Mini Drone UFO Infrared Sensor Induction Aircraft Flying Toy for Kids Quadcopter.

UFO Drone-Hand Operated Drones for Kids, Mini Drone with 360 Degreesrotating, UFO Flying Toys with LED and auto-Avoid Obstacles, Hand-Controlled Flying Ball for Kids & Adult, Indoor Hand Drone Red.

(56) References Cited

OTHER PUBLICATIONS

Buy ZoomTech Min flying UFO Drone Toy IR Sensor Hand Operated for Kids—(Multicolor).
Buy UFO Flying Ball Toys Gravity Defying Hand-Controlled Suspension Helicopter Toy Infrared Induction Interactive Drone Indoor Flyer.
Mini Drone 360 Degrees Rotating Smart Mini UFO Drone for Kids flyinh Toys Gift.
Mini Drone UFO Flying Aircraft toy—Small Drone Perfect for Indoor, Outdooor Play—Cool Hand Controlled Drone for Kids and Adults.
Holy Stone HS3 30 Mini RC Drone Hand Operated & Remoted Control Quadcopter with 3 Batteries for Kids and Beginners.
Marsmo Hand Drone for Kids or Adults, Hand Controlled Flying Toys Drone with 3D Flips and Circle Flight, Mini Ufo Drone Toys for Boys Girls Teenagers.
U.S. Appl. No. 29/787,940, including its patent prosecution history and the Office Actions therein., filed Jun. 9, 2021, Matloff.
Nakata, T. et al., This is a repository Aerodynamic imaging by mosquitoes inspires a surface detector for autonomous flying vehicles, Bioinspired Robots, Science, vol. 368, pp. 634-637, 2020.
Force1 Scoot XL Hand Operated Drone. By USA Toyz. Dated Jun. 15, 2021. Found online [Jul. 21, 2023]. https://www.amazon.com/Force1-F1-SCOOTX-BLU-Kids-Drone/dp/B07WCH MBTB (Year: 2021).
Kid o Myland UFO and Alien Light. By Outside Lines Co. Dated Aug. 19, 2021. Found online [Jul. 21, 2023]. https://www.amazon.com/Kid-Myland-Alien-Interactive-Learning/dp/B06XN Q5ZRV (Year: 2021).
Voyage Aeronautics PA 1003 HD Streaming Video Drone. By Never Too Late. Dated Dec. 7, 2020. Found on line [Aug. 9, 2023]. https://www.youtube.com/watch?v=4kMtH NXu8Ts (Year: 2020).
Drone with 1080P HD Camera for Adults. By PQ One. Dated Dec. 1, 2018. Found on line [Aug. 9, 2023]. https://www.amazon.com/Spacekey-Real-time-Beginners-Quadcopter-Altitude/dp/B07 FDCX6H R (Year: 2018).
Hover Star UFO. By AMAX. Found online [Dec. 13, 2023]. https://www.amaxbrands.com.cn/e_productsshow/?11-product-test-11.html.

\* cited by examiner

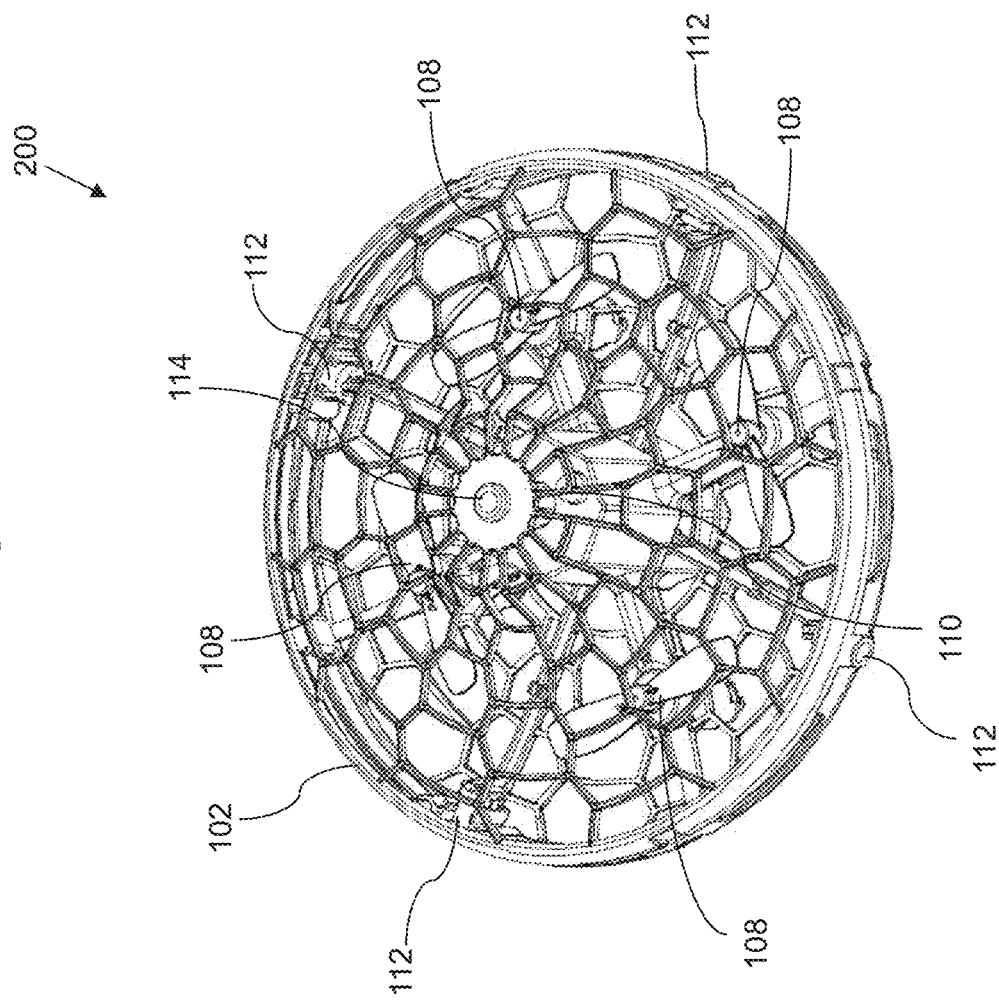

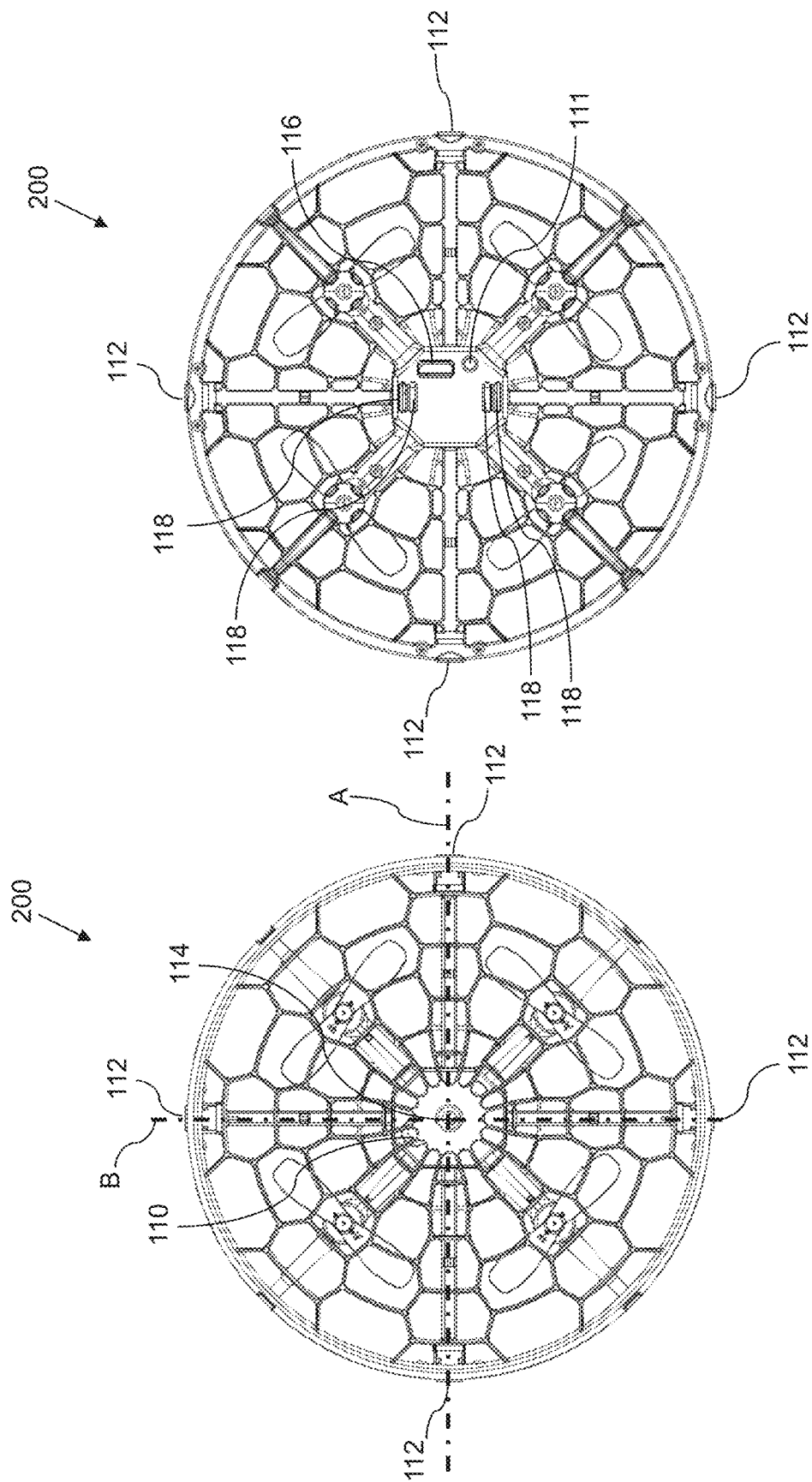

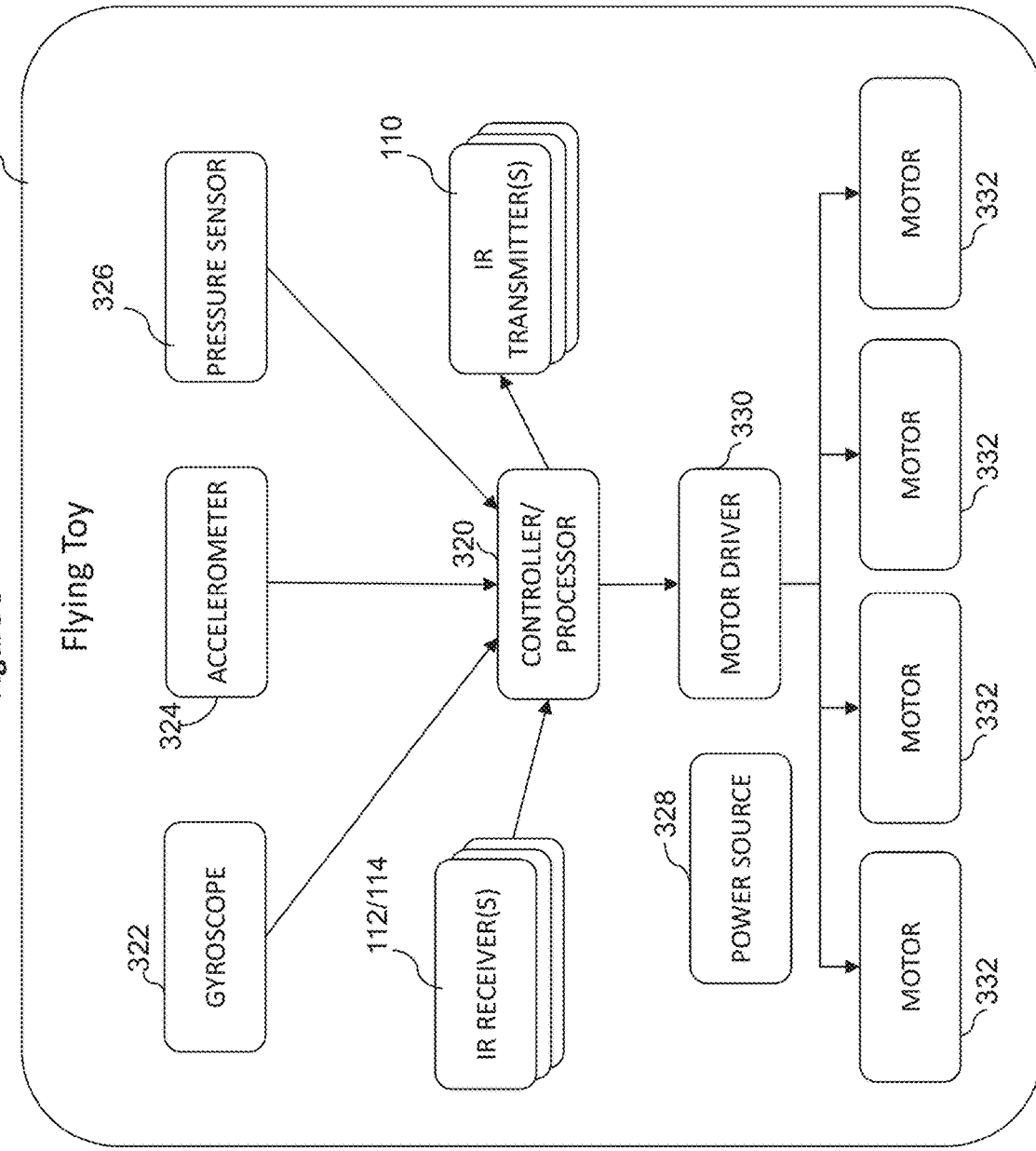

HAND GESTURE CONTROLLED FLYING TOY

CROSS-REFERENCE TO RELATED APPLICATIONS

This application claims the benefit of U.S. Provisional Application No. 63/031,191, titled HAND GESTURE CONTROLLED FLYING TOY, filed on May 28, 2020, which is hereby incorporated by reference herein in its entirety.

FIELD

The disclosure relates generally to the field of flying toys, and more particularly, to systems and methods for hand gesture controlled flying toys.

SUMMARY

The present disclosure presents various embodiments of flying toys that can be controlled using hand gestures, interaction with the environment, and/or the like. Various embodiments utilize infrared sensors, pressure sensors, additional sensors, and/or combinations thereof in order to control the flight of a flying toy and conduct aerial maneuvers. Some embodiments of flying toys disclosed herein are configured to receive input from a user that instructs the flying toy as to how the flying toy should fly and/or as to a specific flight maneuver that should be conducted. For example, some embodiments are configured to ascend when a user places his or her hand underneath the toy while the toy is in flight, as detected by an air pressure sensor. As another example, some embodiments are configured to ascend in response to a user placing his or her hands on opposite sides of the flying toy, as detected by a plurality of IR receivers. As another example, some embodiments are configured to perform stunt-type aerial maneuvers in response to specific interactions with the flying toy by the user. For example, the system may be configured to, in response to determining that a user has passed his or her hand across the top of the flying toy, cause the flying toy to conduct a stunt maneuver, such as a roll or flip.

According to some embodiments, a hand gesture controlled flying toy comprises: a body having one or more propulsion units coupled thereto; a pressure sensor positioned within the body, wherein the body comprises a downward-facing opening that is in fluid communication with the pressure sensor, such that an air pressure wave traveling upward relative to the body and into the opening can be sensed by the pressure sensor; and a control system configured to operate the one or more propulsion units to control flight of the flying toy; wherein the control system is configured to, responsive to determining that the pressure sensor has detected a pressure increase above a threshold level, operate the one or more propulsion units in a manner that causes the flying toy to ascend.

In some embodiments, the hand gesture controlled flying toy further comprises: an acceleration sensor positioned to detect acceleration in at least a vertical direction, wherein the control system is further configured to, when the acceleration sensor indicates the flying toy is accelerating downward, set the threshold level at a level that is higher than an expected magnitude of pressure caused by the flying toy's downward acceleration. In some embodiments, the body comprises multiple downward-facing openings in fluid communication with the pressure sensor. In some embodiments, the multiple downward-facing openings comprise a total opening area of at least 10 mm². In some embodiments, the multiple downward-facing openings comprise a total opening area of at least 20 mm². In some embodiments, the multiple downward-facing openings comprise a plurality of elongated slots through a bottom surface of the body. In some embodiments, the plurality of elongated slots comprise a total opening area of at least of at least 10 mm². In some embodiments, the plurality of elongated slots comprise a total opening area of at least of at least 20 mm². In some embodiments, the downward-facing opening passes through a bottom surface of a portion of the body that defines a cavity within which the pressure sensor is positioned, wherein the pressure sensor is positioned no more than 5 millimeters from the bottom surface. In some embodiments, the pressure sensor is positioned such that there is a direct, straight air flow path between the pressure sensor and the downward-facing opening. In some embodiments, the downward-facing opening comprises a length and a width, with the length being at least three times the width, and wherein the downward-facing opening comprises an opening area of at least 5 mm². In some embodiments, the hand gesture controlled flying toy further comprises one or more additional downward-facing openings in fluid communication with the pressure sensor, wherein a total opening area of all of the downward-facing openings combined is at least 20 mm². In some embodiments, the downward-facing opening passes through a bottom surface of a portion of the body that defines a cavity within which the pressure sensor is positioned, wherein the pressure sensor is positioned no more than 10 millimeters from the bottom surface. In some embodiments, the body further comprises a duct that fluidly couples the opening to the pressure sensor. In some embodiments, the control system is configured to, responsive to determining that the pressure sensor has detected the pressure increase above the threshold level, further determine that the pressure sensor has detected a pressure decrease to below the threshold level within a threshold amount of time, prior to operating the one or more propulsion units in the manner that causes the flying toy to ascend.

According to some embodiments, a hand gesture controlled flying toy comprises: a body having one or more propulsion units coupled thereto; one or more infrared transmitters connected to the body and positioned to transmit infrared light in at least a first lateral direction and a second lateral direction; a plurality of lateral infrared receivers connected to the body, the plurality of lateral infrared receivers comprising at least: a first lateral infrared receiver positioned to detect infrared light reflected from the first lateral direction; and a second lateral infrared receiver positioned to detect infrared light reflected from the second lateral direction; and a control system configured to operate the one or more propulsion units to control flight of the flying toy; wherein the control system is configured to, responsive to determining that both the first lateral infrared receiver and the second lateral infrared receiver are detecting infrared light, operate the one or more propulsion units in a manner that causes the flying toy to ascend.

In some embodiments, the one or more infrared transmitters are positioned to also transmit infrared light in at least an upward direction, and the flying toy further comprises: an upward infrared receiver positioned to detect infrared light reflected from the upward direction, wherein the control system is further configured to, responsive to determining that the upward infrared receiver detected infrared light for a period of time that is no longer than a first threshold time, operate the one or more propulsion units in a manner that causes the flying toy to conduct an aerial stunt. In some embodiments, the aerial stunt comprises a roll about a horizontal axis. In some embodiments, the control system is further configured to: after determining that that the upward infrared receiver detected infrared light for a period of time that is no longer than the first threshold time, wait to determine whether one of the plurality of lateral infrared receivers detects infrared light for a period of time that is no longer than a second threshold time; and if the one of the plurality of lateral infrared receivers detects infrared light for the period of time that is no longer than the second threshold time, orient the horizontal axis about which the roll is conducted at least partially based on which of the plurality of lateral infrared receivers detected the infrared light for the period of time that is no longer than the second threshold time. In some embodiments, the first threshold time and the second threshold time are no greater than 500 milliseconds.

According to some embodiments, a hand gesture controlled flying toy comprises: a body having one or more propulsion units coupled thereto; one or more infrared transmitters connected to the body and positioned to transmit infrared light in at least a first lateral direction, a second lateral direction, and an upward direction; a plurality of lateral infrared receivers connected to the body, the plurality of lateral infrared receivers comprising at least: a first lateral infrared receiver positioned to detect infrared light reflected from the first lateral direction; and a second lateral infrared receiver positioned to detect infrared light reflected from the second lateral direction; an upward infrared receiver positioned to detect infrared light reflected from the upward direction; a pressure sensor positioned within the body, wherein the body comprises a downward-facing opening that is in fluid communication with the pressure sensor, such that an air pressure wave traveling upward relative to the body and into the opening can be sensed by the pressure sensor; and a control system configured to operate the one or more propulsion units to control flight of the flying toy, wherein the control system is configured to, responsive to determining that the pressure sensor has detected a pressure impulse above a threshold level, operate the one or more propulsion units in a manner that causes the flying toy to ascend, and wherein the control system is further configured to, responsive to determining that the upward infrared receiver detected infrared light for a period of time that is no longer than a first threshold time, and then one of the plurality of lateral infrared receivers detected infrared light for a period of time that is no longer than a second threshold time, operate the one or more propulsion units in a manner that causes the flying toy to conduct a roll about a horizontal axis, wherein the horizontal axis is oriented at least partially based on which of the plurality of lateral infrared receivers detected the infrared light for the period of time that is no longer than the second threshold time.

In some embodiments, the first threshold time and the second threshold time are no greater than 500 milliseconds. In some embodiments, the control system is further configured to, responsive to determining that both the first lateral infrared receiver and the second lateral infrared receiver are detecting infrared light, operate the one or more propulsion units in a manner that causes the flying toy to ascend.

BRIEF DESCRIPTION OF THE DRAWINGS

Various embodiments will be described hereinafter with reference to the accompanying drawings. These embodiments are illustrated and described by example only, and are not intended to limit the scope of the disclosure. In the drawings, similar elements have similar reference numerals.

FIGS. 2A-2D illustrate another embodiment of a hand gesture controlled flying toy.

FIG. 3 illustrates a block diagram of an embodiment of a control system for a hand gesture controlled flying toy.

DETAILED DESCRIPTION

Figure 1B:
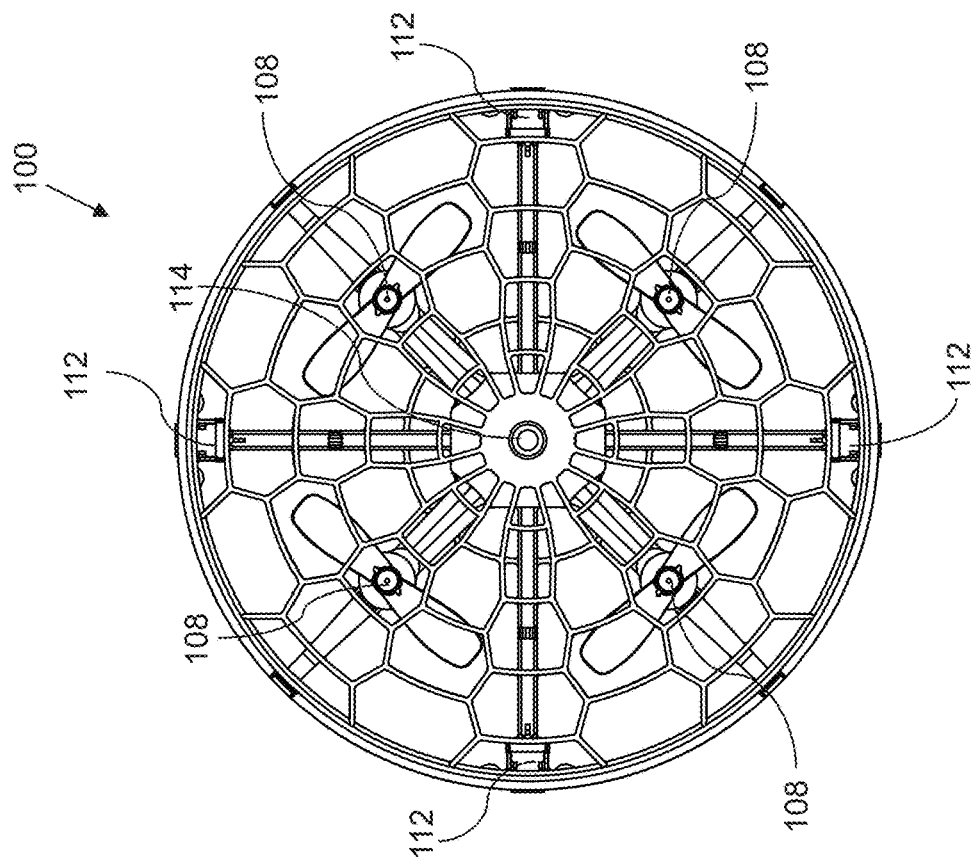
FIGS. 1A-1E illustrate an embodiment of a hand gesture controlled flying toy.

Although embodiments, examples, and illustrations are disclosed below the disclosure described herein extends beyond the specifically disclosed embodiments, examples, and illustrations and includes other uses of the disclosure and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the disclosures herein described.

The present disclosure presents various embodiments of flying toys that can be controlled using hand gestures, interaction with the environment, and/or the like. Various embodiments utilize infrared sensors, pressure sensors (such as air pressure sensors, barometric pressure sensors, altimeters, barometers, and/or the like), additional sensors, and/or combinations thereof in order to control the flight of a flying toy and conduct aerial maneuvers. In some embodiments, the flying toy does not utilize a remote control, and input received via the sensors is the only control input provided to the flying toy. The concepts disclosed herein are not limited to remote-less flying toys, however, and the concepts disclosed herein could be used with flying toys that use a remote control.

Some embodiments of flying toys disclosed herein are configured to receive input from a user that instructs the flying toy as to how the flying toy should fly and/or as to a specific flight maneuver that should be conducted. For example, some embodiments are configured to ascend when a user places his or her hand underneath the toy while the toy is in flight (and/or when a user moves his or her hand toward the underside of the toy while the toy is in flight). For example, a pressure sensor may be used to detect a change in air pressure underneath the flying toy in response to the user placing his or her hand underneath the toy. The system can be configured to respond to that change in air pressure beneath the toy by ascending. In some embodiments, the system is configured to ascend at a higher rate when a more significant change in pressure occurs and/or a faster change in pressure occurs, such as what may occur if the user is more quickly moving his or her hand toward the bottom of the flying toy.

As another example, some embodiments are configured to ascend in response to a user placing his or her hands on opposite sides of the flying toy. Such embodiments may comprise, for example, one or more infrared transmitters or LEDs that transmit infrared light at least laterally (e.g., horizontally if the flying toy is upright in a normal hovering orientation) from the flying toy, and the toy may comprise one or more infrared sensors or detectors that are positioned to detect reflected infrared light from lateral directions. When the system detects that infrared light is being reflected laterally from two opposite directions, the system can be configured to ascend. In some embodiments, the system can be configured to set the rate of ascent and/or the distance of the ascent based at least partially on how the user is interacting with the infrared light. For example, if the user's hands are closer to the flying toy and/or the user is quickly moving his or her hands toward the flying toy, the system may be configured to ascend at a higher rate of speed and/or ascend a further distance (e.g., a greater altitude).

As another example, some embodiments are configured to perform stunt-type aerial maneuvers in response to specific interactions with the flying toy by the user. For example, some embodiments may comprise a plurality of laterally oriented infrared receivers positioned to detect reflected infrared light from various lateral directions, and at least one upward oriented infrared receiver position to detect reflected infrared light reflected from an upward direction. The control system of the flying toy may be configured to, for example, detect when an infrared receiver has received a reflected infrared signal for only a brief instant or period of time, such as would occur when a user passes his or her hand across the sensor or "chops" the area visible or detectable by the sensor. The system may be configured to, in response to determining that a user has passed his or her hand across the top of the flying toy (as detected by a brief reflection received by the upward oriented infrared receiver) cause the flying toy to conduct a stunt maneuver, such as a roll or flip about a lateral or horizontal axis. In some embodiments, instead of using a plurality of infrared receivers positioned to detect reflected infrared light from specific directions, a plurality of infrared transmitters are used to transmit infrared light in a plurality of specific directions, and the light transmitted in each direction may be encoded differently (using any suitable method of transmitting data using infrared light), such that one or more infrared receivers may receive reflected light from multiple directions but be able to decode which direction the light was reflected from.

In some embodiments, the system can utilize a more complex control system that does not merely conduct a roll or flip in response to the user's hand passing the upwardly directed infrared sensor. For example, the system may be configured to, after determining that a user has passed his or her hand across the top of the flying toy, wait for a brief period of time to determine if the user then also passes his or her hand near a lateral side of the flying toy (such as would be detected by one of the plurality of laterally facing infrared detectors). If the system detects that the user does pass his or her hand along a lateral side after passing it along the top of the flying toy, then the system may be configured to, for example, conduct the roll or flip in the direction that the user passed his or her hand along the lateral side. Stated another way, the system may be configured to conduct the roll or flip about an axis that is oriented generally parallel to the direction in which the user passed his or her hand from top to bottom. Further description of such a configuration is described below with reference to the figures.

Although the description and figures included herewith utilize a quadcopter configuration, the concepts and techniques disclosed herein are not limited to use with quadcopters, and various other configurations of flying toys may be utilized, such as flying vehicles having fewer or more than four propellers, helicopters, and/or the like.

Example Flying Toys

Figure 1A:
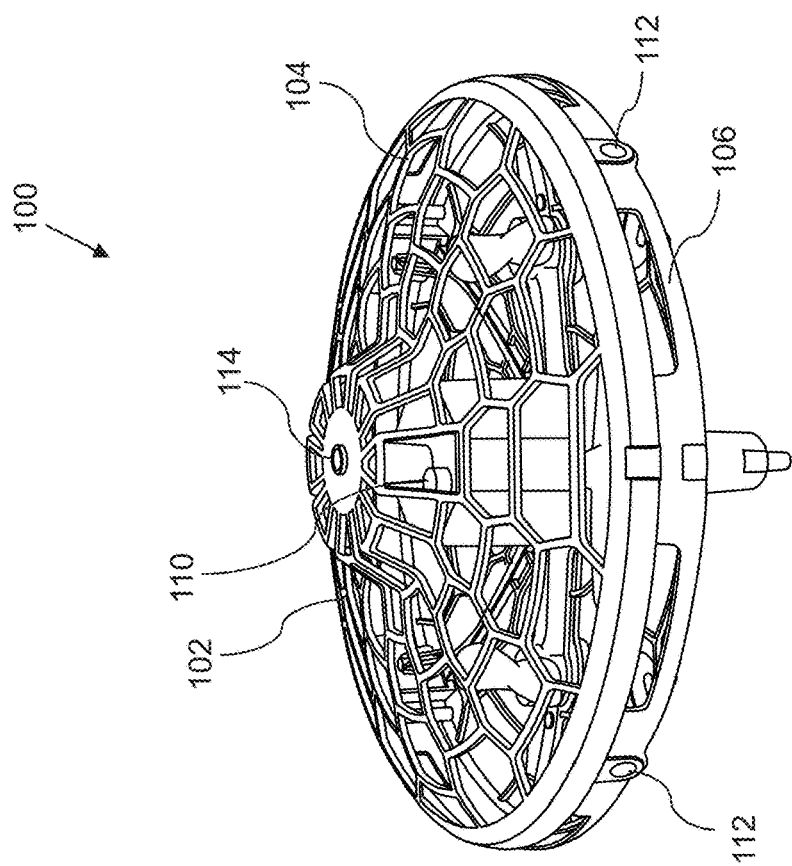
Figure 1C:
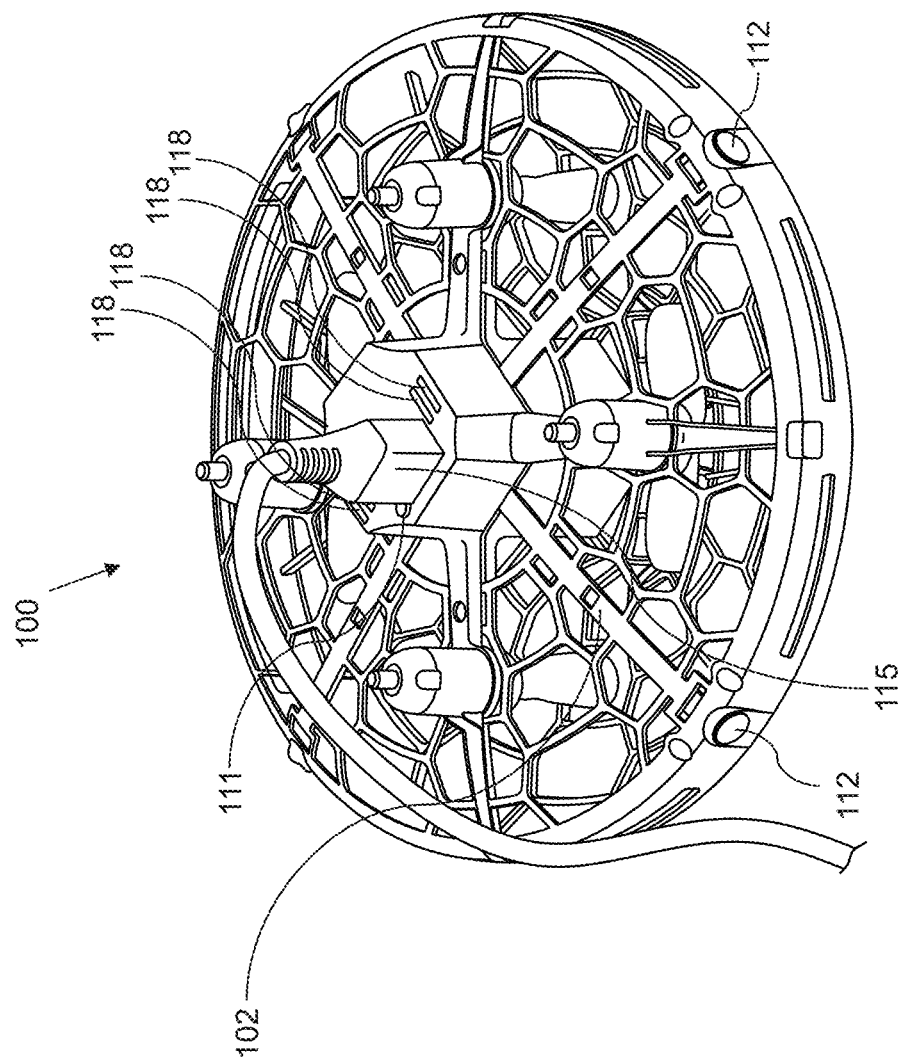
Figure 1E:
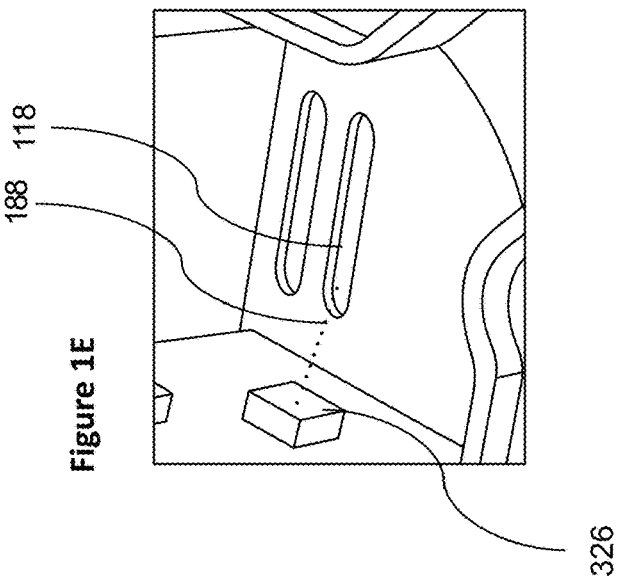
Figure 1D:
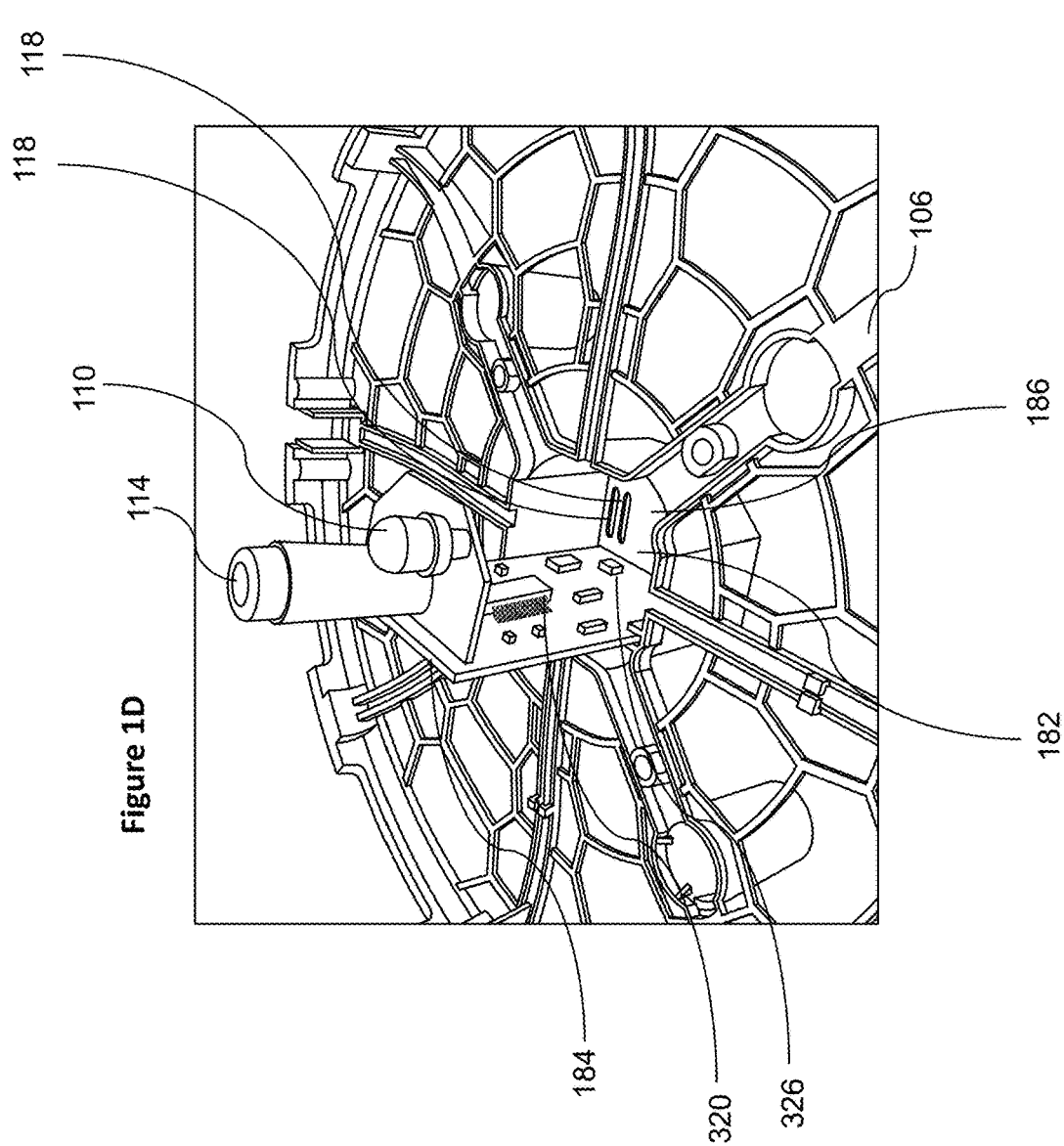

FIGS. 1A-1E illustrate an example embodiment of a hand gesture controlled flying toy 100. FIG. 1A illustrates a top perspective view, FIG. 1B illustrates a top view, FIG. 1C illustrates a bottom perspective view, with a charging cable 115 connected to the toy, FIG. 1D illustrates an interior view of a portion of the flying toy 100 with certain components removed, and FIG. 1E is an enlarge view of a portion of FIG. 1D. The flying toy 100 comprises a body 102 which, in this embodiment, comprises an upper shell 104 and lower shell 106. The flying toy 100 utilizes a quadcopter arrangement that comprises four propulsion units 108 that are controlled by a processor, motor driver, and/or the like that are located within an internal cavity of the body 102 (see, for example, cavity 182 of FIG. 1D).

In order to receive information and/or instructions from a user and/or the environment, the flying toy 100 comprises multiple sensor systems. For example, the flying toy 100 comprises an infrared (IR) transmitter or LED 110 that is positioned such that it will transmit infrared light at least upwardly and laterally from the flying toy 100. Although this embodiment utilizes a single infrared transmitter 110, other embodiments may use more than one infrared transmitter. For example, some embodiments may use a plurality of infrared transmitters that each transmit infrared light in a specific direction, and potentially encoded differently, so that one or more infrared receivers can receive reflected light from multiple infrared transmitters and determine which direction the light was reflected from.

Flying toy 100 further comprises a plurality of lateral IR receivers 112 positioned to detect infrared light that has been transmitted by the infrared transmitter 110 and reflected back along a lateral direction, such as would occur when a user places his or her hands beside the flying toy 100. In this embodiment, the flying toy 100 comprises four lateral IR receivers 112 each positioned 90° apart. Other embodiments may utilize more or fewer lateral IR receivers. The flying toy 100 further comprises an upward facing IR receiver 114 position to detect reflections of the infrared light transmitted by the infrared transmitter 110 that are reflected back from an upward direction, such as would occur when a user places his or her hand above the flying toy 100. Although this embodiment includes a single upward facing IR receiver 114, other embodiments may include multiple upward facing IR receivers or may not include any upward facing IR receivers. The IR receivers discussed herein may be alternatively referred to as IR sensors, IR detectors, and/or the like. In some embodiments, the various IR receivers desirably comprise a detection element that is recessed within a tube or other structure to increase the directionality of the IR detection. In some embodiments, the infrared light transmitted by the infrared transmitter 110 is encoded to enable the system to distinguish between infrared light detected by the IR sensors that is a reflection of the infrared light transmitted by the transmitter 110 and infrared light that is not light transmitted by the transmitter 110. Such functionality may be beneficial, for example, to avoid interference with the flight of the toy by other infrared light sources, such as television remote controls and the like. In some embodiments, the IR transmitter 110 is instead an IR receiver, and the plurality of IR receivers 112, 114 are instead IR transmitters. In such a configuration, the IR transmitters 112, 114 desirably include a transmission element that is recessed within a tube or other structure to increase the directionality of the IR transmission. Further, in such a configuration, the IR light transmitted by each IR transmitter is desirably encoded differently, to enable the single IR receiver 110 to determine which transmitter's IR light is being reflected.

With reference to FIG. 1C, which illustrates the bottom of the flying toy 100, a plurality of openings 118 in the body 102 can be seen. These openings 118 are desirably in fluid communication with a pressure sensor that is located within the central cavity of the body 102 (see pressure sensor 326 within cavity 182 of FIG. 1D). Including the openings 118 can enable the internal pressure sensor to detect changes in air pressure that may be caused by, for example, a user moving his or her hand underneath the flying toy 100, such as the user moving his or her hand upward toward the bottom of the flying toy 100 (and thus toward the openings 118). In addition to detecting changes in air pressure caused by a user moving his or her hand (such as to instruct to the flying toy 100 to ascend), the pressure sensor may also be used to generally detect the barometric pressure indicative of an altitude of the flying toy 100, as one of several inputs to the control system that helps the flying toy 100 maintain stable flight and/or conduct aerial maneuvers.

Although the embodiment illustrated in FIG. 1C includes a plurality of openings 118 that comprise elongated parallel slots, various other arrangements are possible. For example, a single opening 118 may be used, less than four openings 118 may be used, or more than four openings 118 may be used. Further, the one or more openings do not need to be an elongated shape as shown in FIG. 1C. It can be desirable to utilize multiple elongated openings 118 as shown in FIG. 1C, however, because such a configuration can help to allow sufficient opening surface area for sufficiently sensitive detection of pressure changes, while reducing the chance that foreign matter, a child's finger, and/or the like are insertable through the openings. Detecting a pressure change, pressure wave, pressure impulse, and/or the like caused by a user moving his or her hand underneath the toy as a flight control instruction can require more sensitivity and/or less restriction in airflow between the pressure sensor and the ambient environment than if the pressure sensor were used merely as an altimeter. For example, a relatively small hole through the housing may be sufficient to use the pressure sensor as an altimeter, but such a relatively small hole may restrict airflow sufficiently that the pressure sensor is not sensitive enough to pressure changes caused by a user moving his or her hand underneath the toy.

In some embodiments, the plurality of openings 118 each comprise an elongated opening that is approximately 5.8 millimeters long by 1.2 millimeters wide. The total opening area of each opening 118 may be approximately 7 mm$^2$. The total opening area of all four of the openings 118 combined may be approximately 28 mm$^2$. It can be desirable to have a relatively large opening area, such as to increase the sensitivity of the pressure sensor to quick pressure waves that could be caused by, for example, a user moving their hand toward the underside of the toy. As discussed above, this can be different than a typical use case of a pressure sensor in a quadcopter, which may, for example, merely be used as an altimeter. In an altimeter use case, it is not as important to be able to detect quick pressure waves as could be cause by a user moving his or her hand under the toy, so a much smaller opening that exposes the pressure sensor to the ambient environment may be desirable. In some embodiments, the combined total opening area of all openings into the cavity that are pointed downward and that allow fluid communication between the environment and the pressure sensor is at least 5, 10, 15, 20, or 25 mm$^2$. In some embodiments, the opening area of each individual opening is at least 2.5, 5, 10, or 15 mm$^2$. In some embodiments, the length of each opening 118 is approximately five times the width of each opening 118. It can be desirable to have a relatively high ratio of length to width of the openings 118, such as to allow for a relatively large opening area while limiting the ability for foreign objects, such as a child's finger, to be inserted through the openings. In some embodiments, the length of each opening 118 is at least two, three, four, five, six, seven, eight, nine, or 10 times the width of each opening 118. In some embodiments, openings are only present on the bottom of the toy, and are not present on the sides or top. This can be desirable, for example, to avoid the pressure sensor detecting pressure impulses when a user or other object is moved along the sides or top of the toy. In some embodiments, the sides and top of the housing may not necessarily be sealed, but any openings in the sides and/or top (such as openings to allow an IR transmitter or receiver to pass therethrough) may be configured such that the amount of opening area that air could pass through is significantly smaller than the total amount of opening area for the openings 118 on the bottom (such as, for example, no more than 1%, 2%, 3%, 4%, 5%, 10%, or 20% of the total opening area for the openings 118).

With continued reference to FIG. 1C, the flying toy 100 also comprises a power button 111 which may be used to, for example, turn the flying toy 100 on and off. The flying toy 100 also includes a charging port (not visible in this view but similar to charging port 116 shown in FIG. 2C), which in this figure has a charging cable 115 connected thereto.

FIG. 1D illustrates a perspective view of the lower shell 106 of the flying toy 100, with various components removed in order to show certain details of the inside of the toy. Specifically, the lower shell 106 defines an internal cavity 182 into which a circuit board 184 is at least partially inserted (with a similar cavity of the upper shell enclosing the rest of the circuit board 184). The circuit board 184 can comprise a controller 320 and a pressure sensor 326, among various other electronic components. The pressure sensor 326 may, for example, be a surface mount barometric pressure sensor, an altimeter, a barometer, and/or any other type of sensor configured to detect air pressure changes (for example, a non-contact pressure sensor, as opposed to, for example, a contact-type pressure sensor configured to detect physical contact pressure, such as from a user pressing against the sensor with his or her hand).

As can be seen in FIG. 1D, the pressure sensor 326 is desirably positioned relatively close to the bottom surface 186 of the cavity 182. This can be desirable, for example, in order to position the pressure sensor 326 relatively close to the openings 118, such as to increase the sensitivity of the pressure sensor 326 to pressure waves or fluctuations resulting from a user moving his or her hand underneath the toy. In this embodiment, the pressure sensor 326 is desirably approximately 4 mm from the bottom surface 186 of the cavity 182 (measured vertically from the bottom surface 186 to the closest edge of the sensor 326 to the bottom surface 186). In some embodiments, the pressure sensor 326 is no more than one, two, three, four, five, six, seven, eight, nine, or 10 mm from the bottom surface 136 of the cavity 182. In some embodiments, the distance from the pressure sensor 326 to the bottom surface 186 is less than the length of the openings 118. In some embodiments, the distance from the pressure sensor 326 to the bottom surface 186 is no more than 0.5, 1, 1.5, 2, 2.5, or 3 times the length of the openings 118. In some embodiments, the pressure sensor 326 is positioned such that, once all components are installed and the flying toy is in its finished configuration, there is a straight, direct air flow path between the pressure sensor 326 and at least one of the openings 118, with no internal components blocking the straight, direct air flow path. FIG. 1E is an enlarged view of a portion of FIG. 1D, illustrating such a straight, direct air flow path 188. For example, a battery may be positioned within the cavity 182 next to the circuit board 184, but the battery may be positioned such that the battery does not block a direct path from the pressure sensor 326 to one or more of the openings 118 (such as path 188). In some embodiments, one or more ducts may be included to direct airflow from one or more openings 118 to the pressure sensor 326.

Figure 2D:
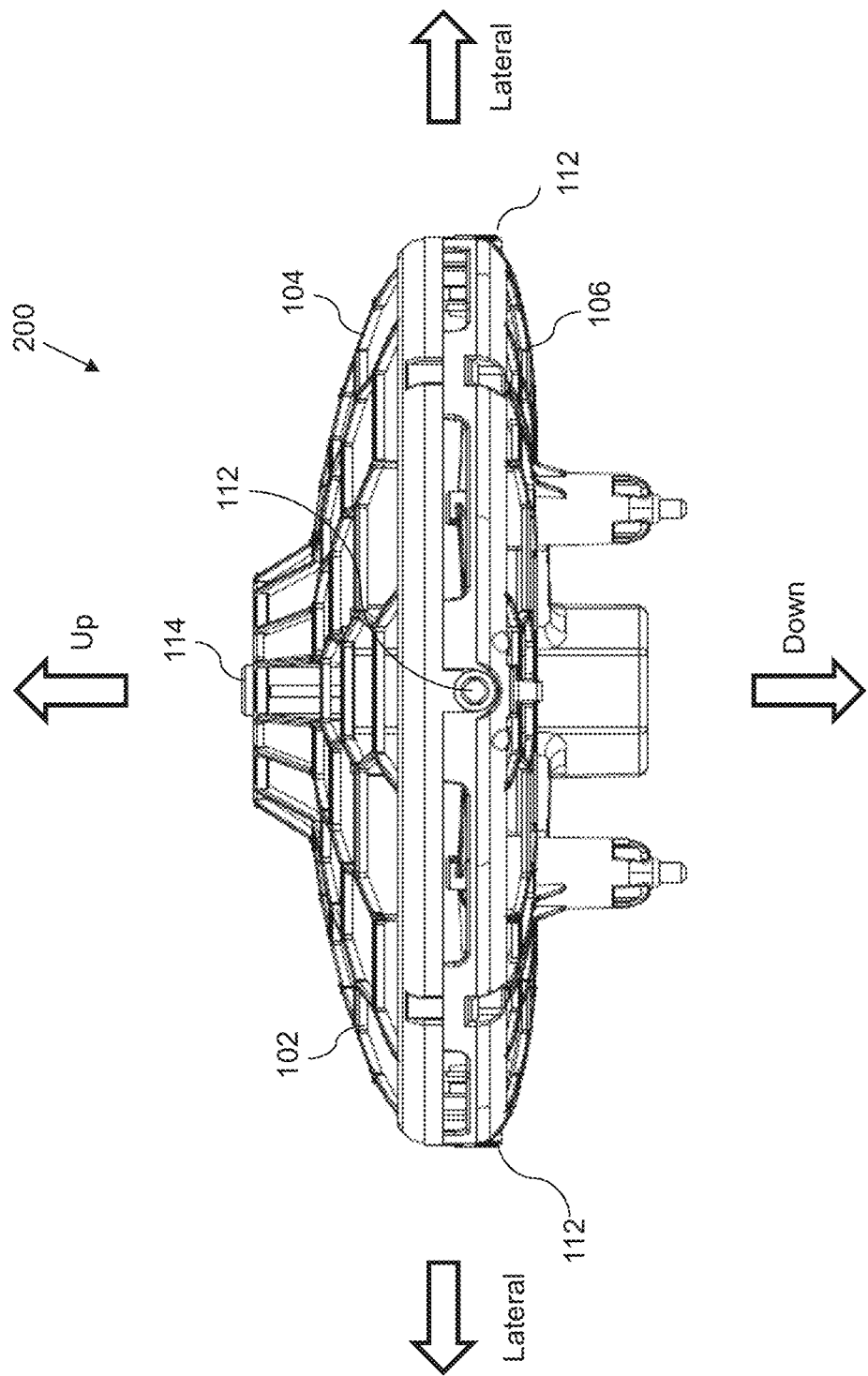

FIGS. 2A-2D illustrate another example embodiment of a flying toy 200. FIG. 2A is a top perspective view, FIG. 2B is a top view, FIG. 2C is a bottom view, and FIG. 2D is a side view. The flying toy 200 is similar in many respects to the flying toy 100 described above, and thus the same reference numbers are used to refer to similar or identical features. For efficiency, the present description focuses on differences in the drawings of FIGS. 2A-2D with respect to the drawings of FIGS. 1A-1E.

One difference from the flying toy 100's figures is that FIG. 2C illustrates a bottom view of the flying toy 200 without a charging cable connected. Accordingly, charging port 116 is visible in the bottom view of FIG. 2C. Another difference in the figures is that FIG. 2D illustrates a general coordinate system or orientation as used in various portions of this description. Specifically, FIG. 2D illustrates that, when the present description refers to an upward direction or a downward direction, unless otherwise stated, the direction is in reference to the area above or below the body 102 of the flying toy. Further, when the present description refers to a lateral direction, unless otherwise stated, the direction is in reference to the area horizontally outward from the body 102 of the flying toy. In many cases, such as when the flying toy is hovering, the upward, downward, and lateral directions with respect to the body of the flying toy may be coincident with upward, downward, and lateral directions with respect to the environment.

Another difference in the figures for the flying toy 200 is that FIG. 2B illustrates two example lateral or horizontal axes A and B. The orientation of axes A and B can help to illustrate how, for example, a roll or flip may be conducted when a user passes his or her hand past the upper IR receiver 114 and then one of the lateral IR receivers 112. For example, in some embodiments, the system may be configured such that, if the user passes his or her hand past the upper IR receiver 114 and then past one of the lateral IR receivers 112 that is in line with axis A, the flying toy 200 may be configured to conduct a flip or roll about axis B or some other axis that is parallel to axis B. For example, the flying toy 200 could conduct a roll about an axis that is parallel to axis B but spaced apart from axis B by, for example, 1 foot, 2 feet, 3 feet, or the like.

Hand Gesture Controlled Flying Toy Control System

FIG. 3 illustrates an example embodiment of a block diagram illustrating certain portions of a control system of a flying toy 300. The flying toy 300 may be similar to or identical to the flying toys 100 and 200 discussed above. In this embodiment, the flying toy 300 comprises one or more IR transmitters 110 and one or more IR receivers 112/114, similar to as described above. The block diagram of FIG. 3, however, also illustrates various other components of a flying toy that are not visible in the above-discussed external views of the flying toy. For example, the flying toy 300 desirably comprises a controller or processor 320 that receives input from a number of sensors, plans out aerial maneuvers, and controls a motor driver 330, which in turn drives the plurality of motors 332 in order to conduct flight of the flying toy 300. The flying toy 300 further comprises a gyroscope 322, accelerometer 324, and pressure sensors 326. Each of these sensors may be configured to communicate with the controller 320 in order to assist the controller 320 in conducting stable flight and/or other maneuvers of the flying toy 300. Each of these components may be included as part of, for example, the circuit board 184 of FIG. 1D. In some embodiments, each of these components is a separate component. In some embodiments, at least some of these components are combined into a single integrated circuit, surface mount component, and/or the like. The flying toy 300 further comprises a power source 328, such as a battery.

Following are several example process flow diagrams that illustrate example processes for implementing flight maneuvers, such as ascending, rolling, and/or the like, based on detection of hand gestures using infrared and/or pressure-based sensors. It should be noted that these process flow diagrams are merely examples, and the concepts disclosed herein with respect to hand gesture control techniques are not necessarily limited to these specific example embodiments. It should also be noted that, although these process flows illustrate specific examples of maneuvers that can be performed in response to a user interacting with the sensors in various ways, the flying toy may also be configured to conduct various other maneuvers in response to readings from the sensors. For example, the system may generally be configured to avoid hitting a ceiling by stopping an ascent and/or starting a descent maneuver when a reflection is detected by the upper IR receiver 114. Further, the system may generally be configured to avoid hitting lateral obstacles, such as walls, by stopping a lateral flight maneuver and/or moving in the opposite direction when a lateral IR reflection is received by a lateral IR receiver 112. In some embodiments, the flying toy can be configured to activate its propulsion units and begin flying when a user presses a button on the toy, when a user throws the toy into the air as detected by, for example, the accelerometer or gyroscope, when a user holds the toy in the air and lets it go, and/or the like.

Example Pressure-Based Flight Maneuver—Ascending

Figure 4:
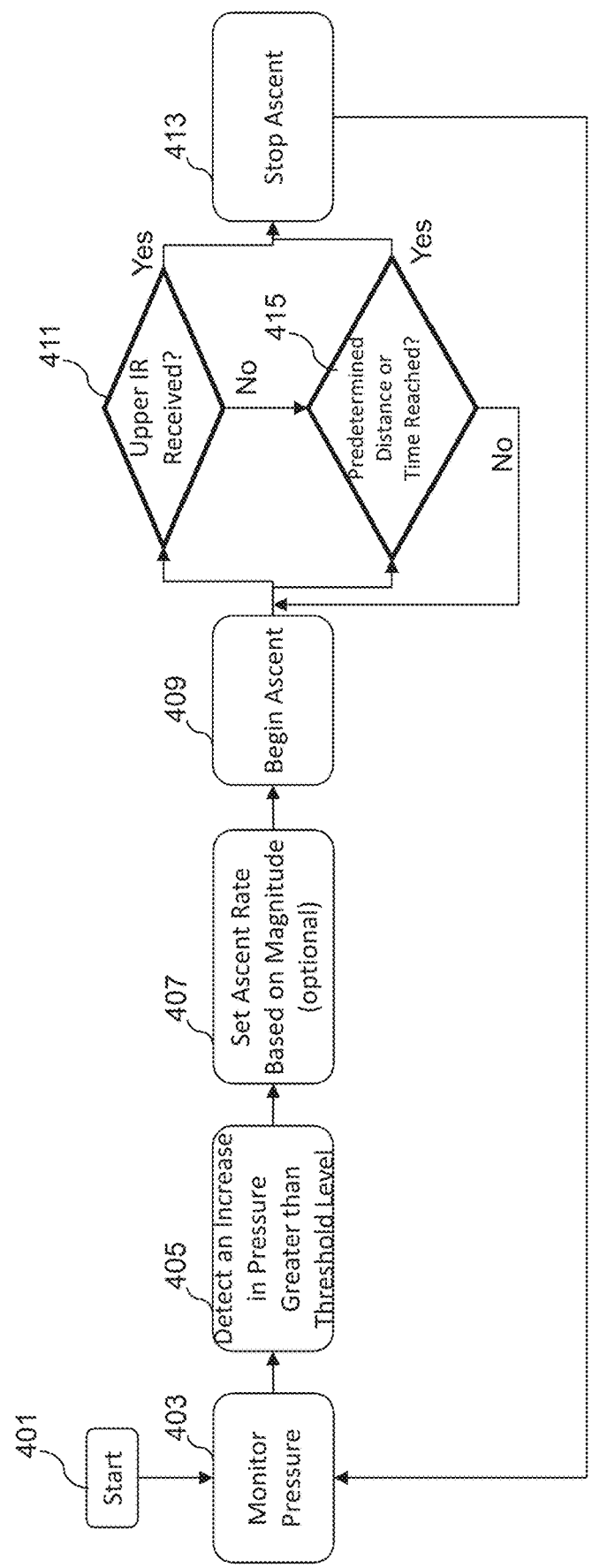
FIG. 4 illustrates a process flow diagram for an embodiment of a flight maneuver initiated by a change in pressure detected by an air pressure sensor.

As described above, some embodiments of hand gesture controlled flying toys may be configured to ascend in response to a user placing or moving his or her hand underneath the flying toy, as detected by a change in air pressure. FIG. 4 illustrates an example embodiment of a process flow for conducting such a flight maneuver.

The process flow begins at block 401. At block 403, the system monitors a pressure, such as by monitoring an air pressure as detected by pressure sensor 326 of flying toy 300. At block 405, the system detects an increase in pressure that is greater than a threshold level, such as an increase in pressure that would be caused by a user placing his or her hand underneath the toy and/or the user placing his or her hand underneath the toy and moving his or her hand toward the toy. It should be noted that, during flight, at least small changes in pressure will likely be continually present, such as changes in pressure due to planned altitude changes of the flight and/or changes in pressure due to air movements below the toy caused by the propulsion units. It can be desirable for the system to be able to determine, however, when a change in pressure has occurred that is in response to a user placing his or her hand beneath the toy instead of a typical change in pressure due to merely the planned flight. This can be performed in various ways. For example, the system may have a predetermined threshold level that, once exceeded, is considered to be a detection of a user interacting with the pressure sensor. The predetermined threshold level may be set higher than, for example, an expected level of "noise" that is caused by the propulsion units during normal flight. As another example, the system may be configured to anticipate expected changes in pressure, such as due to a planned ascent or dissent, and adjust a threshold level accordingly. For example, if the flying toy is conducting a planned flight maneuver that includes descending 5 feet, the control system may be configured to anticipate the expected amount of change in barometric pressure and the expected speed of that change in barometric pressure as the flying toy conducts its "descending 5 feet" maneuver. The system may then be configured to detect a user interacting with the pressure sensor as the pressure sensor detecting a magnitude of pressure that is higher than the expected magnitude by at least a certain amount (such as at least 10%, 20%, 30%, 40%, 50%, 100%, or 200% higher), and/or as the pressure sensor detecting a rate of increase in the detected pressure that is higher than the expected rate of increase by at least a certain amount (such as at least 10%, 20%, 30%, 40%, 50%, 100%, or 200% higher). In some embodiments, the system may require at block 405 that the system detect a pressure impulse as opposed to merely an increase in pressure greater than a threshold level. For example, the system may be configured to detect that the pressure has increased to above a threshold level, and also that the pressure decreases to back below the threshold level within a threshold amount of time. Such an impulse may be indicative of the type of relatively quick spike in pressure that would be caused by a user briefly interacting with the toy. In some embodiments, the threshold amount of time that the pressure can be above the threshold level before it drops back below the threshold level and still be considered a detection of such an impulse may be equal to or no greater than 10 ms, 20 ms, 30 ms, 40 ms, 50 ms, 60 ms, 70 ms, 80 ms, 90 ms, 100 ms, 200 ms, 250 ms, 300 ms, 400 ms, or 500 ms.

At block 407, the control system may be configured to optionally set an ascent rate based on the magnitude of pressure change and/or the rate at which the pressure increased or is increasing. For example, the system may be configured to ascend at a faster rate in response to a higher increase in pressure and/or a higher rate of increase in pressure. At block 409, the flying toy begins ascending. For example, the controller 320 of the flying toy 300 may control the motor driver 330 and motors 332 in a manner that causes the flying toy to ascend.

Blocks 411 and 415 illustrate that the flying toy's ascent maneuver may be stopped in at least two different ways. For example, the system may be configured to monitor the upper infrared receiver 114 for reflections of infrared light transmitted by the IR transmitter 110, which may be indicative of the flying toy approaching a ceiling. At block 411, if an IR reflection is received by the upper IR receiver 114, the process flow proceeds to block 413 where the ascent is stopped. The process flow then proceeds back to block 403. If an upper IR reflection is not received at block 411, the process flow proceeds to block 415. The ascent maneuver that began at block 409 is desirably configured to continue until a predetermined altitude has been reached and/or until the toy has ascended for a predetermined period of time. At block 415, the system is configured to check whether that predetermined altitude or distance (such as may be detected by the pressure sensor 326) or time has been reached, and, if it has, to proceed to block 413 and stop the ascent. If the predetermined altitude or distance or time has not been reached, the process flow proceeds back to just after block 409 and continues as described above.

Example IR-Based Flight Maneuver—Ascending

Figure 5:
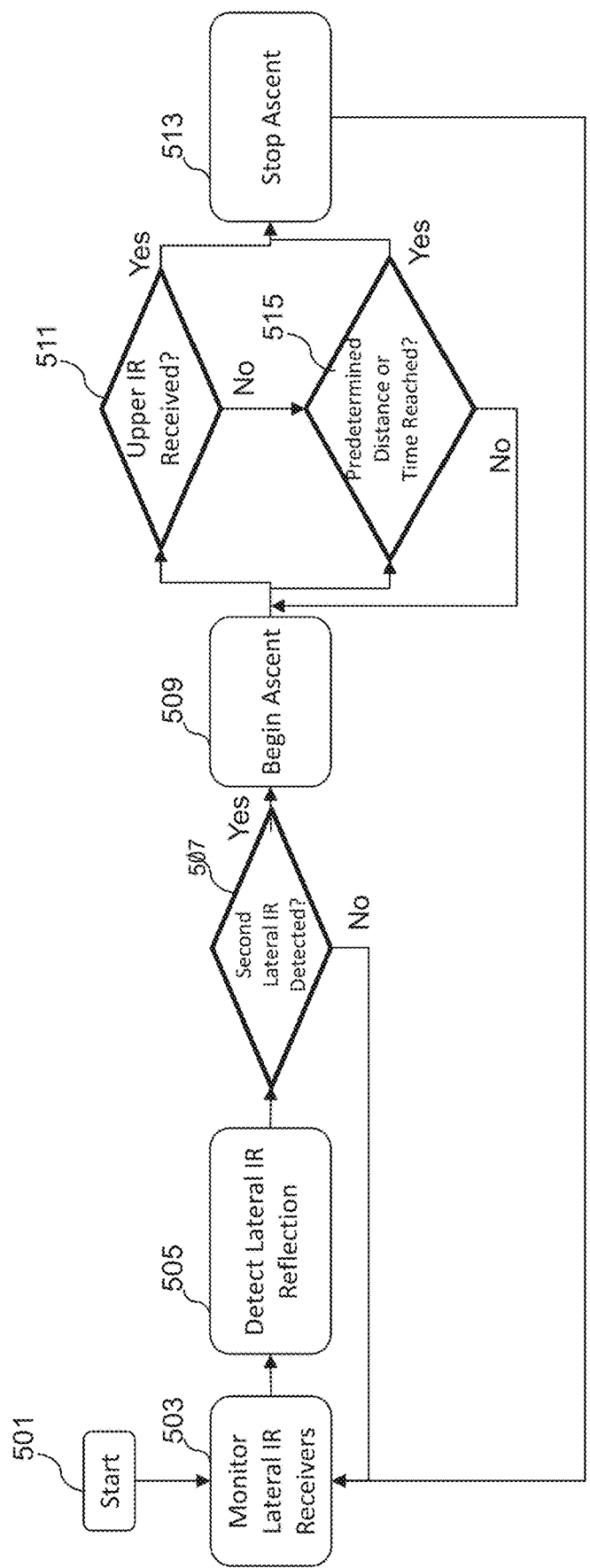
FIG. 5 illustrates a process flow diagram for an embodiment of a flight maneuver initiated by a detection of multiple IR reflections.

As discussed above, some embodiments of flying toys disclosed herein are configured to ascend in response to a user placing his or her hands on two opposite lateral side of the flying toy. FIG. 5 illustrates an example embodiment of a process flow diagram that illustrates one example method for conducting such ascent. The process flow starts at block 501. At block 503, the system monitors a plurality of laterally facing IR receivers. For example, the system may be configured to monitor the four lateral IR receivers 112 of flying toys 100 or 200. At block 505, the system detects a lateral infrared reflection. For example, the system may determine that one of the lateral IR receivers 112 has detected a reflection of infrared light transmitted by IR transmitter 110. At block 507, the process flow varies depending on whether a second lateral IR reflection is detected. For example, the system may be configured to determine whether an IR reflection has also been received by a lateral IR receiver 112 that is positioned laterally opposite to the lateral IR receiver 112 that detected the first reflection. If so, the process flow proceeds to block 509, and if not, the process flow proceeds back to block 503. It should be noted that, although some embodiments herein are described as detecting lateral IR reflections that are opposite to one another, similar techniques may be used for detection of multiple IR reflections that are not necessarily exactly opposite one another. For example, similar techniques may be used to cause the flying toy to ascend in response to a user placing his or her hands near two different lateral IR receivers 112 that are positioned 90° apart from one another instead of 180° apart. Other embodiments may have the lateral IR receivers positioned differently, and may not necessarily require that activating an ascent in the process flow of FIG. 5 require that two IR receivers that are exactly opposite one another detect IR reflections. Also, in some embodiments, the system may be configured to, if a second lateral IR reflection is not detected at block 507, operate the flying toy to move laterally away from the IR reflection that was detected at block 505, instead of proceeding directly back to block 503.

At block 509, the control system operates the propulsion systems to cause the flying toy to ascend. The process flow then proceeds similarly to blocks 411 through 415 of FIG. 4, described above. Namely, if an upper IR reflection is received at block 511, the ascent is stopped at block 513 and the process flow proceeds back to block 503. Likewise, if a predetermined altitude, distance, or time is reached at block 515, the ascent is stopped at block 513, and, if not, the process flow proceeds back to just after block 509.

Example IR-Based Flight Maneuver—Roll

Figure 6:
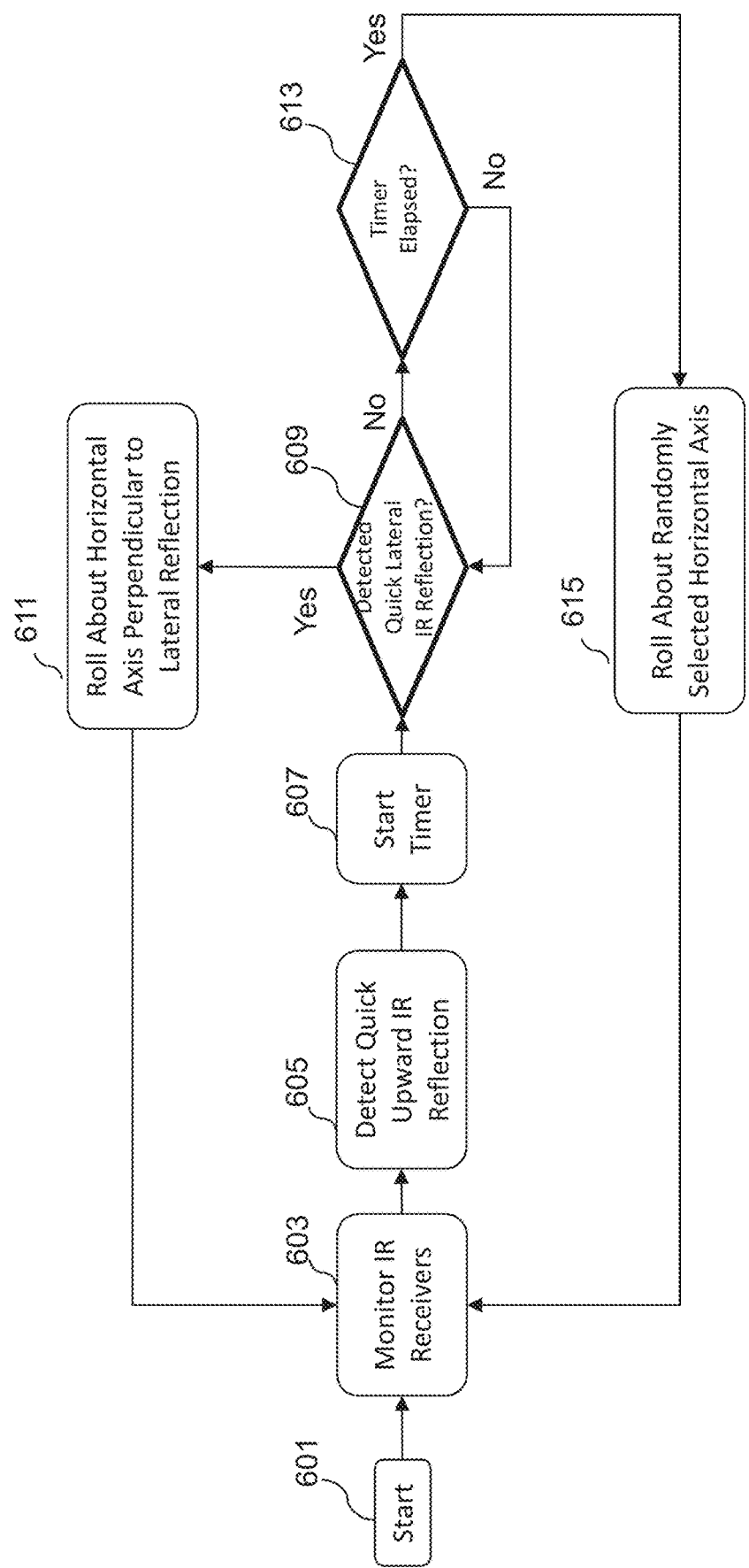
FIG. 6 illustrates a process flow diagram for an embodiment of a stunt flight maneuver initiated by detection of one or more IR reflections.

As discussed above, flying toys disclosed herein may be configured to perform a stunt flight maneuver or aerial maneuver in response to specific instructions received from the user via the IR receivers. FIG. 6 illustrates an example embodiment of a process flow diagram that illustrates one such maneuver, wherein a user briefly passing his or her hand over the upper IR receiver 114, and optionally then also briefly passing his or her hand beside one of the lateral IR receivers 112, causes the flying device to perform a roll or flip maneuver. Stated another way, if a user's hand crosses the top of the toy, that is considered an instruction to flip, and then optionally crossing a side of the toy tells the toy which way to flip.

The process flow begins at block 601. At block 603, the control system monitors a plurality of IR receivers, such as upper IR receiver 114 and lateral IR receivers 112, for receipt of reflected infrared light, such as infrared light transmitted by IR transmitter 110. At block 605, the system determines that a brief or quick reflection was detected by the upwardly facing IR receiver 114. For example, the system may be configured to detect such a brief reflection by starting a timer when the upper IR receiver 114 first detects a signal reflection, and considering that it is a brief or quick reflection if the reflection goes away with in a threshold period of time, such as 100, 200, 300, 400, 500, 600, 700, 800, 900, or 1000 ms.

After a quick upper IR reflection is detected at block 605, a timer is started at block 607. At block 609, the process flow varies depending on whether a brief or quick lateral IR reflection is then detected. For example, if the user passed his or her hand over the upper IR receiver 114 and then passed his or her hand beside one of the lateral IR receivers 112, the latter would desirably be detected as a brief or quick lateral IR reflection at block 609. A similar detection method as to the upper reflection may be used, such as by considering it a brief or quick reflection if the reflection goes away within a threshold period of time such as 100, 200, 300, 400, 500, 600, 700, 800, 900, or 1000 ms.

If a quick lateral IR reflection is detected at block 609, the process flow proceeds to block 611. At block 611, the control system operates the propulsion units to cause the flying toy to conduct a roll or flip maneuver about a specific horizontal or lateral axis. For example, the horizontal or lateral axis about which the roll maneuver is performed may be oriented perpendicularly to the direction in which the lateral reflection was received. Stated another way, with reference to FIG. 2B, if the lateral reflection is received by one of the lateral receivers 112 that are in line with axis A, then the roll maneuver may be conducted about axis B or some other axis that is parallel to axis B.

Returning to block 609, if a quick lateral IR reflection has not been detected, the process flow proceeds to block 613. At block 613, the process flow varies depending on whether the timer started at block 607 has elapsed. If the timer has not elapsed, the process flow proceeds back to block 609, and continues as described above. If the timer has elapsed at block 613, then the process flow proceeds to block 615. At block 615, a roll or flip maneuver similar to as would be conducted at block 611 is performed, but the lateral or horizontal axis about which the roll maneuver is conducted is selected randomly. The process flow then proceeds back to block 603 and proceeds as described above.

In an alternative embodiment of the process flow illustrated in FIG. 6, the system is configured to, after block 609 but before block 611, wait a brief period of time to determine whether a pressure sensor also detects a pressure impulse, similar to as described above with respect to block 405 of FIG. 4. If a pressure impulse is detected, the process flow proceeds to block 611, but if a pressure impulse is not detected, the process flow proceeds to block 615. Stated another way, in this alternative embodiment, in order for a user to direct the flying toy to roll in a particular direction, the user is required to cross the top of the device with their hand, then cross a lateral side of the device in the direction in which the user wishes device to roll, and then also cross the bottom of the device. In essence, the user could move their hand in a sideways U-shaped path instead of an L-shaped path. In a further alternative embodiment, block 615 may not be present, meaning that the device would only conduct a roll maneuver if the process flow passes through block 611.

Other Remarks

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the disclosures or claims.

Any ranges disclosed herein also encompass any and all overlap, sub-ranges, and combinations thereof. Language such as "up to," "at least," "greater than," "less than," "between," and the like includes the number recited. Numbers preceded by a term such as "approximately," "about," and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although the features that have been disclosed in the context of certain preferred embodiments and examples, it will be understood by those skilled in the art that the present disclosure extends beyond the specifically disclosed embodiments to other alternative embodiments and/or uses of the disclosure and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present disclosure herein disclosed should not be limited by the particular disclosed embodiments described above.

What is claimed is:

1. A hand gesture controlled flying toy, comprising:
a body having one or more propulsion units coupled thereto;
a pressure sensor positioned within the body,
wherein the body comprises a downward-facing opening that is in fluid communication with the pressure sensor, such that an air pressure wave traveling upward relative to the body and into the opening can be sensed by the pressure sensor; and a control system configured to operate the one or more propulsion units to control flight of the flying toy;

wherein the control system is configured to, responsive to determining that the pressure sensor has detected a pressure increase above a threshold level, operate the one or more propulsion units in a manner that causes the flying toy to ascend;

wherein the downward-facing opening passes through a bottom surface of a portion of the body that defines a cavity within which the pressure sensor is positioned, wherein the pressure sensor is positioned no more than 10 millimeters from the bottom surface.

2. The hand gesture controlled flying toy of claim 1, further comprising:

an acceleration sensor positioned to detect acceleration in at least a vertical direction, wherein the control system is further configured to, when the acceleration sensor indicates the flying toy is accelerating downward, set the threshold level at a level that is higher than an expected magnitude of pressure caused by the flying toy's downward acceleration.

3. The hand gesture controlled flying toy of claim 1, wherein the body comprises multiple downward-facing openings in fluid communication with the pressure sensor.

4. The hand gesture controlled flying toy of claim 3, wherein the multiple downward-facing openings comprise a total opening area of at least 10 mm².

5. The hand gesture controlled flying toy of claim 3, wherein the multiple downward-facing openings comprise a total opening area of at least 20 mm².

6. The hand gesture controlled flying toy of claim 3, wherein the multiple downward-facing openings comprise a plurality of elongated slots through the bottom surface.

7. The hand gesture controlled flying toy of claim 6, wherein the plurality of elongated slots comprise a total opening area of at least of at least 10 mm².

8. The hand gesture controlled flying toy of claim 6, wherein the plurality of elongated slots comprise a total opening area of at least of at least 20 mm².

9. The hand gesture controlled flying toy of claim 1, wherein the pressure sensor is positioned no more than 5 millimeters from the bottom surface.

10. The hand gesture controlled flying toy of claim 1, wherein the pressure sensor is positioned such that there is a direct, straight air flow path between the pressure sensor and the downward-facing opening.

11. The hand gesture controlled flying toy of claim 10, wherein the downward-facing opening comprises a length and a width, with the length being at least three times the width, and wherein the downward-facing opening comprises an opening area of at least 5 mm².

12. The hand gesture controlled flying toy of claim 11, further comprising one or more additional downward-facing openings in fluid communication with the pressure sensor, wherein a total opening area of all of the downward-facing openings combined is at least 20 mm².

13. The hand gesture controlled flying toy of claim 1, wherein the control system is further configured to, responsive to determining that the pressure sensor has detected the pressure increase above the threshold level, further determine that the pressure sensor has detected a pressure decrease to below the threshold level within a threshold amount of time, prior to operating the one or more propulsion units in the manner that causes the flying toy to ascend.

14. A hand gesture controlled flying toy, comprising:

a body having one or more propulsion units coupled thereto;

one or more infrared transmitters connected to the body and positioned to transmit infrared light in at least a first lateral direction, a second lateral direction, and an upward direction;

a plurality of lateral infrared receivers connected to the body, the plurality of lateral infrared receivers comprising at least:

a first lateral infrared receiver positioned to detect infrared light reflected from the first lateral direction; and a second lateral infrared receiver positioned to detect infrared light reflected from the second lateral direction;

an upward infrared receiver positioned to detect infrared light reflected from the upward direction; and a control system configured to operate the one or more propulsion units to control flight of the flying toy;

wherein the control system is configured to, responsive to determining that both the first lateral infrared receiver and the second lateral infrared receiver are detecting infrared light, operate the one or more propulsion units in a manner that causes the flying toy to ascend; and wherein the control system is further configured to, responsive to determining that the upward infrared receiver detected infrared light for a period of time that is no longer than a first threshold time, operate the one or more propulsion units in a manner that causes the flying toy to conduct an aerial stunt.

15. The hand gesture controlled flying toy of claim 14, wherein the aerial stunt comprises a roll about a horizontal axis, and wherein the control system is further configured to:

after determining that that the upward infrared receiver detected infrared light for a period of time that is no longer than the first threshold time, wait to determine whether one of the plurality of lateral infrared receivers detects infrared light for a period of time that is no longer than a second threshold time; and if the one of the plurality of lateral infrared receivers detects infrared light for the period of time that is no longer than the second threshold time, orient the horizontal axis about which the roll is conducted at least partially based on which of the plurality of lateral infrared receivers detected the infrared light for the period of time that is no longer than the second threshold time.

16. The hand gesture controlled flying toy of claim 15, wherein the first threshold time and the second threshold time are no greater than 500 milliseconds.

17. A hand gesture controlled flying toy, comprising:

a body having one or more propulsion units coupled thereto;

one or more infrared transmitters connected to the body and positioned to transmit infrared light in at least a first lateral direction, a second lateral direction, and an upward direction;

a plurality of lateral infrared receivers connected to the body, the plurality of lateral infrared receivers comprising at least:

a first lateral infrared receiver positioned to detect infrared light reflected from the first lateral direction; and a second lateral infrared receiver positioned to detect infrared light reflected from the second lateral direction;

an upward infrared receiver positioned to detect infrared light reflected from the upward direction;

a pressure sensor positioned within the body, wherein the body comprises a downward-facing opening that is in fluid communication with the pressure sensor, such that an air pressure wave traveling upward relative to the body and into the opening can be sensed by the pressure sensor; and a control system configured to operate the one or more propulsion units to control flight of the flying toy, wherein the control system is configured to, responsive to determining that the pressure sensor has detected a pressure increase above a threshold level, operate the one or more propulsion units in a manner that causes the flying toy to ascend, and wherein the control system is further configured to, responsive to determining that the upward infrared receiver detected infrared light for a period of time that is no longer than a first threshold time, and then one of the plurality of lateral infrared receivers detected infrared light for a period of time that is no longer than a second threshold time, operate the one or more propulsion units in a manner that causes the flying toy to conduct a roll about a horizontal axis, wherein the horizontal axis is oriented at least partially based on which of the plurality of lateral infrared receivers detected the infrared light for the period of time that is no longer than the second threshold time.

18. The hand gesture controlled flying toy of claim 17, wherein the first threshold time and the second threshold time are no greater than 500 milliseconds, and wherein the control system is further configured to, responsive to determining that both the first lateral infrared receiver and the second lateral infrared receiver are detecting infrared light, operate the one or more propulsion units in a manner that causes the flying toy to ascend.

* * * * *